G. F. McCOMBS.
DENTAL TOOL FOR EXTRACTING LOWER MOLARS.
APPLICATION FILED OCT. 25, 1920.
1,389,954.
Patented Sept. 6, 1921.
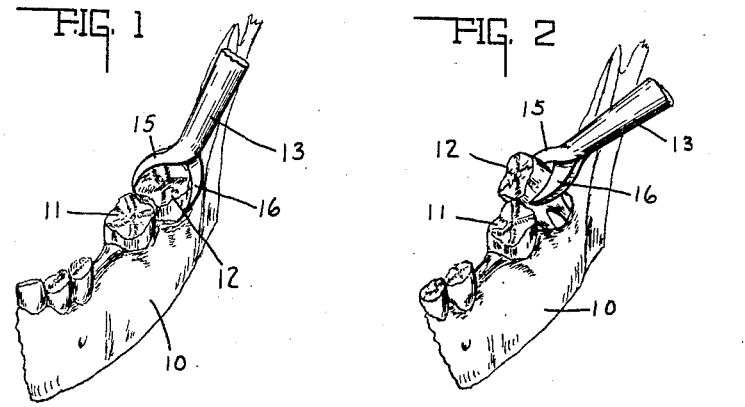
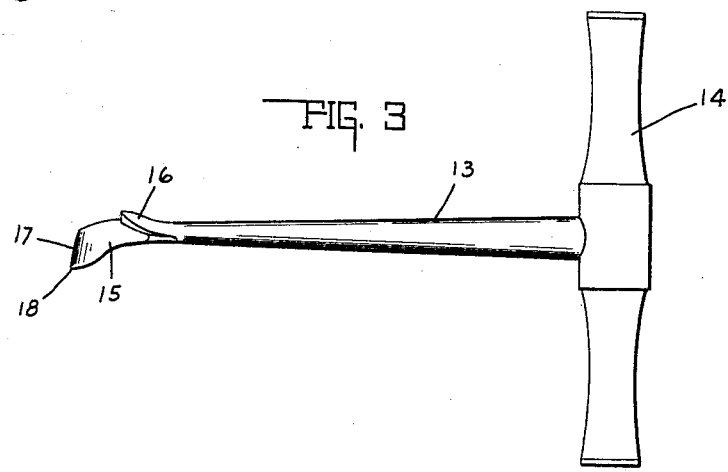
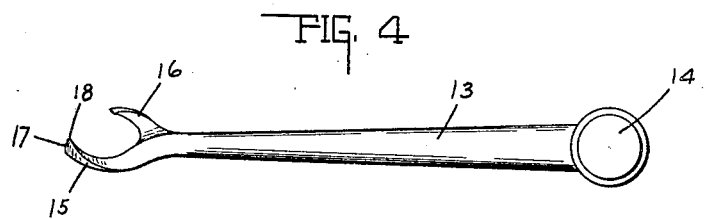
INVENTOR.
GEORGE F. McCOMBS.
BY
ATTORNEYS.

UNITED STATES PATENT OFFICE.

GEORGE F. McCOMBS, OF CONNERSVILLE, INDIANA.

DENTAL TOOL FOR EXTRACTING LOWER MOLARS.

1,389,954. Specification of Letters Patent. Patented Sept. 6, 1921.

Application filed October 25, 1920. Serial No. 419,423.

*To all whom it may concern:*

Be it known that I, GEORGE F. McCOMBS, a citizen of the United States, and a resident of Connersville, county of Fayette, and State of Indiana, have invented a certain new and useful Dental Tool for Extracting Lower Molars; and I do hereby declare that the following is a full, clear, and exact description thereof, reference being had to the accompanying drawings in which like numerals refer to like parts.

This invention relates to an instrument for extracting teeth, and particularly the lower molars.

The chief object of the invention is to provide an instrument which will cut away the disto-lingual plate of bone, thereby engaging and embracing the lower molar so as to grip it, twist and pry it free from the jaw and more easily remove it therefrom.

The full nature of the invention will be understood from the accompanying drawings and the following description and claims.

In the drawings, Figure 1 illustrates a section of the lower jaw showing the instrument in its first or engaging position. Fig. 2 is the same as Fig. 1 showing the instrument in its clamping and extracting position. Fig. 3 is a plan view of the instrument and Fig. 4 is a side elevation thereof.

In the drawings, there is shown the left portion of the lower jaw 10 with the second molar 11 and third molar 12. The instrument is adapted to be used for extracting the lower molars, and as shown herein, particularly the third lower molar. It consists of a shank 13 having a handle 14 mounted thereon with a bifurcated end having a bone cutting member 15 and a prying lever 16, said cutting member and lever being curved in the manner shown in Fig. 4 for embracing and gripping the tooth for extracting it.

The method of using the instrument is as follows: The cutting member is placed over the lingual side of the molar, while the lever engages the buccal side in the manner shown in Fig. 1. The sharp chisel-like edge 17 of the cutting member is forced down on the lingual side of the molar between the molar and the gum and bone, cutting away the disto-lingual plate of bone and past the tissues, thereby making the removal of the lower third molar easier; while the lever grips the buccal side thereof. Upon swinging the instrument toward the anterior of the jaw, the sharp and substantially pointed edge 18 of the cutting member cuts back toward the root, while the pointed end of the lever is forced down on the buccal side of the tooth in such a position that by giving a twist to the instrument in the manner of a cork screw, the lever will lift and pry the tooth loose and cause it to be twisted and forced out of the jaw bone, as shown in Fig. 2.

The invention claimed is:

1. An instrument for extracting lower teeth including a shaft having its operating end formed with a curved bone cutting member, and an oppositely curved prying-lever for engaging and embracing the tooth to be extracted, whereby the twisting of said tool will cause said tooth to be gripped and removed.

2. An instrument for extracting lower teeth including a shaft having its operating end formed with a curved bone cutting member, said member being provided with a chisel edge, and an oppositely curved prying lever substantially lever pointed at its end, whereby said member may be inserted on the lingual side of the tooth and said lever on the buccal side thereof for embracing and gripping said tooth and removing it by twisting and prying the same, substantially as shown.

3. An instrument for extracting lower teeth including a shaft having its operating end formed with an inwardly curved bone-cutting member, said member being provided with a chisel edge adapted to cut away the disto-lingual plate of bone, thereby making the removal of the tooth easier, and an oppositely-disposed and inwardly-curved prying lever adapted to grip the tooth, said member and lever having substantially the same relation to each other as the fingers and thumb respectively of the left hand, whereby the tooth may be removed by a cork screw and prying movement.

In witness whereof, I have hereunto affixed my signature.

DR. GEORGE F. McCOMBS.